(12) United States Patent
Muellenbach

(10) Patent No.: US 11,015,330 B2
(45) Date of Patent: *May 25, 2021

(54) TOILET WITH OVERFLOW PROTECTION

(71) Applicant: Kohler Co., Kohler, WI (US)

(72) Inventor: Keith E. Muellenbach, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/502,569

(22) Filed: Jul. 3, 2019

(65) Prior Publication Data

US 2019/0323222 A1 Oct. 24, 2019

Related U.S. Application Data

(63) Continuation of application No. 15/706,405, filed on Sep. 15, 2017, now Pat. No. 10,352,031.

(60) Provisional application No. 62/398,215, filed on Sep. 22, 2016.

(51) Int. Cl.
  *E03D 11/16* (2006.01)
  *E03D 11/14* (2006.01)
  *E03D 11/00* (2006.01)

(52) U.S. Cl.
  CPC ............. *E03D 11/16* (2013.01); *E03D 11/00* (2013.01); *E03D 11/14* (2013.01); *Y02A 10/30* (2018.01)

(58) Field of Classification Search
  CPC ......... E03D 11/16; E03D 11/00; E03D 11/14; Y02A 10/30

USPC .............................................................. 4/427
See application file for complete search history.

(56) References Cited

U.S. PATENT DOCUMENTS

| 1,205,078 | A | 11/1916 | Barron |
| 2,778,029 | A | 1/1957 | Young |
| 3,262,132 | A | 7/1966 | Mann |
| 4,204,285 | A | 5/1980 | Pak |
| 6,944,892 | B1 | 9/2005 | Giolas |
| 7,302,714 | B2 | 12/2007 | Orcutt |
| 7,757,312 | B2 | 7/2010 | Stack et al. |
| 8,151,377 | B2 | 4/2012 | Pickle |
| 10,352,031 | B2 * | 7/2019 | Muellenbach .......... E03D 11/14 |
| 2010/0242159 | A1 | 9/2010 | Stack et al. |
| 2010/0299823 | A1 | 12/2010 | Stack et al. |

(Continued)

FOREIGN PATENT DOCUMENTS

| CA | 2620564 | 3/2007 |
| CN | 101297085 | 10/2008 |
| EP | 1928628 | 6/2008 |

(Continued)

*Primary Examiner* — Tuan N Nguyen
(74) *Attorney, Agent, or Firm* — Lempia Summerfield Katz LLC

(57) ABSTRACT

A toilet includes a base and a basin. The base supports the toilet on a surface. The basin is supported by the base. The base defines a primary toilet outlet and a secondary toilet outlet spaced apart and independent from the primary toilet outlet. The basin is supported by the base. The basin defines a primary basin outlet and a secondary basin outlet. The primary basin outlet is in fluid communication with the primary toilet outlet by way of a primary drain path. The secondary basin outlet is in fluid communication with the secondary toilet outlet by way of a secondary drain path independent from the primary drain path.

20 Claims, 5 Drawing Sheets

(56) References Cited

U.S. PATENT DOCUMENTS

2016/0024774 A1    1/2016   Stack

FOREIGN PATENT DOCUMENTS

| JP | 4813557 B | 11/2011 |
|---|---|---|
| WO | WO2007030129 | 3/2007 |

* cited by examiner

TOILET WITH OVERFLOW PROTECTION

CROSS-REFERENCE TO RELATED PATENT APPLICATIONS

The present application is a Continuation of U.S. patent application Ser. No. 15/706,405, filed Sep. 15, 2017 (now U.S. Pat. No. 10,352,031), which claims the benefit of, and priority to, U.S. Provisional Patent Application No. 62/398,215, filed Sep. 22, 2016. The disclosures of each of the aforementioned applications are incorporated herein by reference in their entireties as if fully presented herein.

BACKGROUND

The present disclosure relates generally to the field of commercial toilets. More specifically, the present disclosure relates to an overflow protection system for commercial toilets.

SUMMARY

One embodiment relates to a toilet. The toilet includes a base and a basin. The base supports the toilet on a surface. The base defines a primary toilet outlet and a secondary toilet outlet spaced apart and independent from the primary toilet outlet. The basin is supported by the base. The basin defines a primary basin outlet and a secondary basin outlet. The primary basin outlet is in fluid communication with the primary toilet outlet by way of a primary drain path. The secondary basin outlet is in fluid communication with the secondary toilet outlet by way of a secondary drain path independent from the primary drain path.

Another embodiment relates to a toilet assembly. The toilet assembly includes a base, a basin, and a drain assembly. The base supports the toilet on a surface. The base defines a primary toilet outlet and a secondary toilet outlet. The basin is supported by the base. The basin is configured to selectively receive and collect fluid. The basin defines a primary basin outlet. The primary basin outlet is configured to provide fluid from the basin to the primary toilet outlet via a primary drain path. The drain assembly is configured to be coupled to the base. The drain assembly includes a first inlet, a second inlet, a channel, and a common outlet. The first inlet is configured to receive fluid from the primary toilet outlet. The second inlet is configured to receive fluid from the secondary toilet outlet. The channel fluidly couples the first inlet and the second inlet. The common outlet receives fluid from the channel such that fluid provided from the first inlet is provided to the common outlet and fluid provided from the second inlet is provided to the common outlet.

Yet another embodiment is related to a toilet. The toilet includes a base, a basin, and a reservoir. The base supports the toilet on a surface. The base defines a primary toilet outlet and a secondary toilet outlet spaced apart and independent from the primary toilet outlet. The basin is supported by the base. The basin is configured to selectively receive and collect water. The basin defines a primary basin outlet and a secondary basin outlet. The primary basin outlet is in fluid communication with the primary toilet outlet by way of a primary drain path. The secondary basin outlet is in fluid communication with the secondary toilet outlet by way of a secondary drain path. The reservoir is coupled to the basin. The reservoir is configured to selectively receive water from the secondary basin outlet and to collect water. The secondary drain path is in fluid communication with the reservoir such that water provided from the reservoir is provided to the secondary toilet outlet. Water is provided from the secondary basin outlet to the reservoir once a target volume of water has collected within the basin.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is not defined by any particular embodiment described herein. Before turning to the figures, which illustrate exemplary embodiments in detail, it should be understood that the application is not limited to the details or methodology set forth in the description or illustrated in the figures. It should also be understood that the terminology is for the purpose of the descriptions only and should not be regarded as limiting.

Generally speaking, commercial toilets have a higher water pressure and volume of water than gravity-based toilets. This requires an overflow protection system that can handle larger quantities of water at a higher rate. Without the capability to handle larger quantities of water when a drain is clogged, the toilet would overflow and require cleanup.

Accordingly, referring generally to the figures, disclosed herein are mechanisms for a toilet that minimize the risk of overflow in a commercial toilet.

Figure 1:
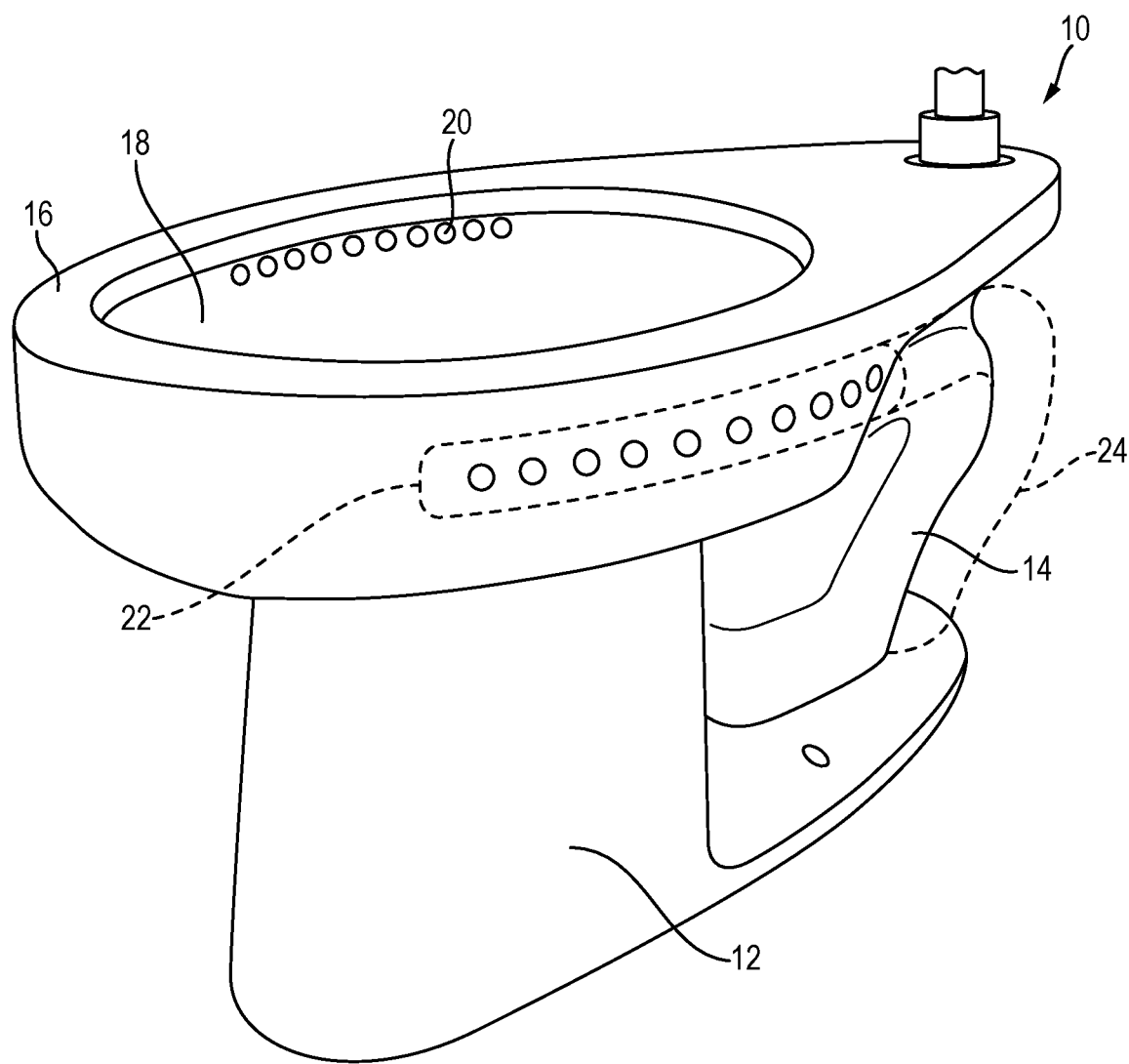
FIG. 1 is a perspective view of a toilet with overflow holes and shown with an overflow water capture mechanism hidden, according to an exemplary embodiment.

Referring to FIG. 1, a perspective view of a toilet 10 with overflow holes 20 is shown, according to an exemplary embodiment. The toilet 10 may operate with a commercial valve such as a flushometer valve. When the flushometer valve is in a stuck open position, extra water may accumulate in toilet 10.

Toilet 10 is shown to include a base 12, a rim 16, and a basin 18. The base 12 includes a primary drain 14 (e.g., primary drain path, etc.). The base 12 provides structural support for the toilet 10 and houses the primary drain 14 which terminates in an outlet 15 (e.g., primary toilet outlet, etc.). The base 12 may also couple to a floor of a bathroom to prevent the toilet 10 from moving. The base 12 supports basin 18. The basin 18 collects water and captures waste for removal. The basin 18 has an outlet 19 (e.g., a primary basin outlet, etc.) coupled to the primary drain 14. The primary drain 14 eliminates the waste and water collected by the basin 18. The primary drain 14 couples to a pipe in the floor to remove the waste. The basin 18 also includes overflow holes 20 (e.g., secondary basin outlet, etc.) that selectively provide water into a secondary drain 21 (e.g., secondary drain path, etc.). The secondary drain 21 terminates in an outlet 23 (e.g., secondary toilet outlet, etc.). A bottom surface 25 of the base 12 is disposed along a plane 25. The outlet 15 and the outlet 23 are also disposed along the plane 27. The basin 18 also supports a rim 16. The rim 16 may support a toilet seat (not shown).

The toilet 10 is configured to be selectively flushed. When the toilet 10 is flushed, waste within the basin 18 may be expelled therefrom and the basin 18 may be refilled with a refill volume of water. The refill volume of water within the basin 18 after a flush may be substantially constant. However, if the toilet 10 is flushed and a blockage occurs (e.g., due to excessive waste, etc.), water from within the basin 18 may not be completely expelled, and when the basin 18 is refilled with water, a volume of water within the basin 18 exceeds the refill volume of water. The overflow holes 20 are positioned (e.g., along the basin 18, etc.) and configured (e.g., sized, shaped, etc.) such that water exits from the basin 18 via the overflow holes 20 when the volume of water within the basin 18 exceeds a threshold volume. The threshold volume may be a maximum volume of water desired within the basin 18. In this way, the overflow holes 20 may mitigate or completely prevent overflow situations where the volume of water within the basin is caused to exceed the volume of the basin 18.

The overflow holes 20 are positioned (e.g., disposed, centered, aligned, etc.) on a plane that is above a plane upon which an outlet of the basin 18 is positioned. In other words, the overflow holes 20 are above the outlet of the basin 18. The overflow holes 20 may be positioned proximate the rim 16. As shown in FIG. 1, the overflow holes 20 are positioned along lateral sides of the basin 18. However, the overflow holes 20 may, additionally or alternatively, be positioned at other locations of the basin 18, such as on a rear side and a front side. The overflow holes 20 may be symmetrically or asymmetrically positioned on the basin 18. For example, the overflow holes 20 may be positioned on only one lateral side of the basin 18.

In FIG. 1, an overflow reservoir 22, which is positioned over the overflow holes 20, is hidden (e.g., shown in dotted lines, etc.) in order to illustrate the relative positioning of the overflow holes 20 and the overflow reservoir 22. As shown, the overflow reservoir 22 is coupled to the basin 18 over the overflow holes 20 such that water provided from the overflow holes 20 flows into the overflow reservoir 22. The overflow reservoir 22 functions to direct water from the overflow holes 20 towards a common outlet of the toilet 10.

The rim 16 may also mask the overflow holes 20 from sight when using the toilet 10. The overflow holes 20 are located within the basin 18 and may be located just under the rim 16 to aid in masking the overflow holes 20 from view. The overflow holes 20 may be located such that a rim wash can bypass the overflow holes 20 without affecting flushing performance of the toilet. In some embodiments, the overflow holes 20 are located on the sides of the basin 18. In some embodiments, the overflow holes 20 are located at the front of the basin 18. In some embodiments, the overflow holes 20 are all equal in diameter (e.g., ½ inch). In other embodiments, the overflow holes 20 may vary in size. The number of overflow holes 20 may vary (e.g., 6-20 holes). The shape, size (e.g., diameter, volume, cross-sectional area, etc.), and/or number of overflow holes 20 may be based on the capacity of water that the toilet 10 handles (e.g., 8.8-30 gpm). In some embodiments, an elongated slot (e.g., a slot of approximately 0.5 inch width and 8 inch length) is used in place of the overflow holes 20 (as shown in FIG. 2B). In some embodiments, the overflow holes 20 can accommodate a water flow of at least 30 gpm.

Figure 2A:
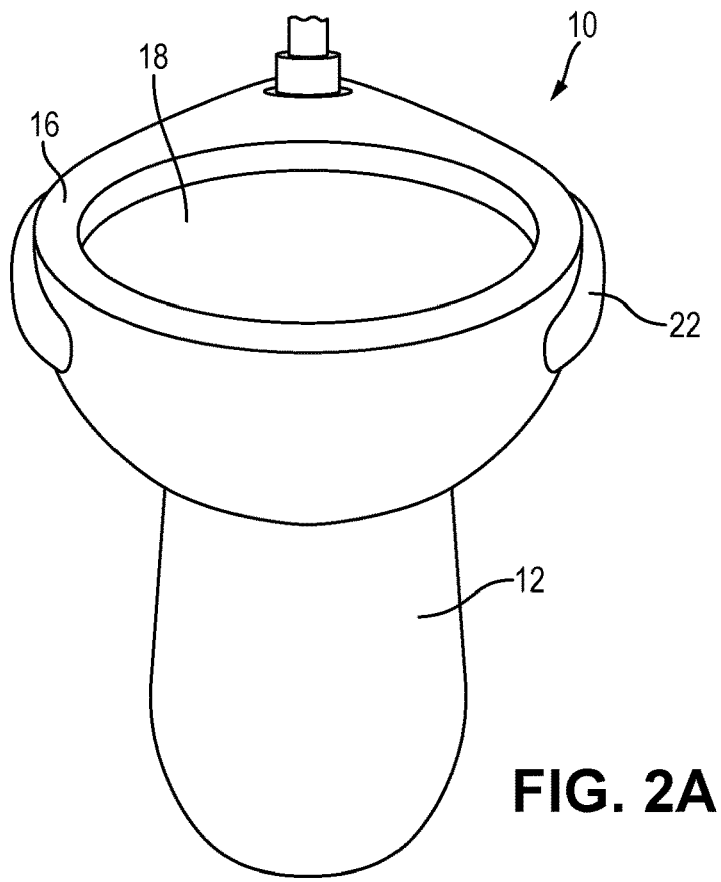
FIG. 2A is a front view of the toilet with overflow holes of FIG. 1 with an overflow water capture mechanism, according to an exemplary embodiment.
Figure 2B:
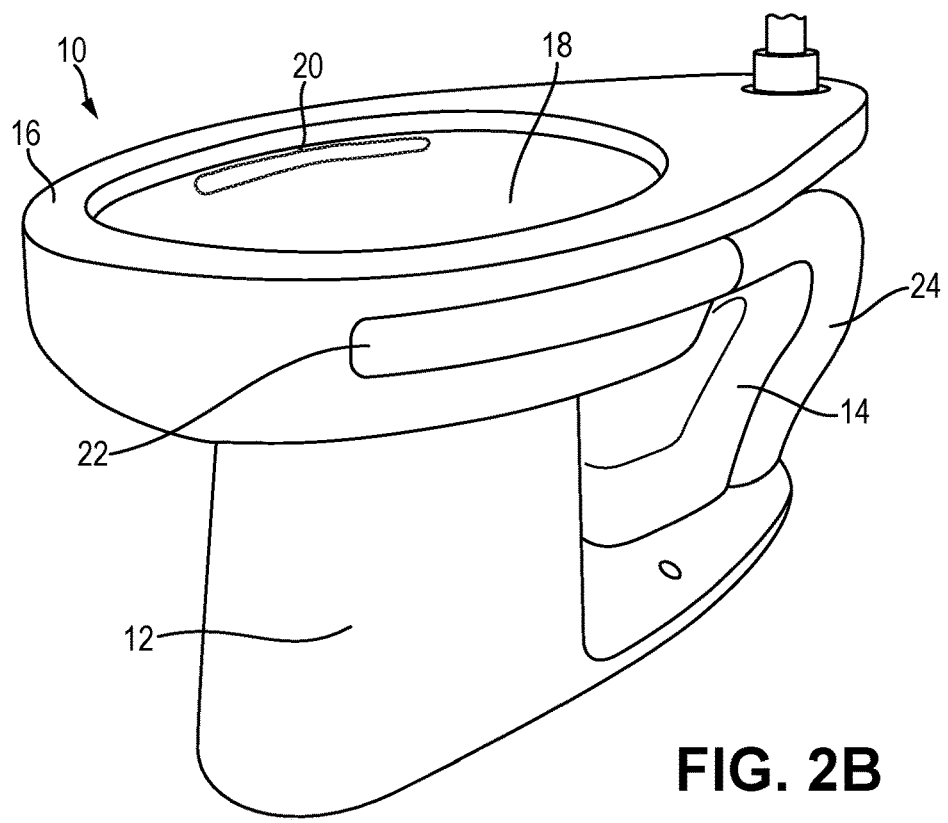
FIG. 2B is a side view of the toilet with overflow holes of FIG. 1 with an overflow water capture mechanism, according to an exemplary embodiment.

Referring to FIGS. 2A and 2B, a front view and a side view of the toilet 10 with the overflow holes 20 of FIG. 1 and an overflow water capture mechanism is shown, according to an exemplary embodiment. After water exits the overflow holes 20, the water is captured by the overflow reservoir 22. The overflow reservoir 22 may be coupled to an exterior surface of the basin 18 and be aligned with (e.g., positioned over, etc.) the overflow holes 20. In some embodiments, the overflow reservoir 22 may be within walls of the basin 18 such that the overflow reservoir 22 and the basin 18 are a single unit and define a uniform basin 18. The overflow reservoir 22 may be angled along the basin 18 to facilitate the movement of water from the overflow reservoir 22 to an overflow tube 24. The opposite end of the overflow tube 24 is coupled to a drain in the floor. In some embodiments, the overflow tube 24 may be encased in the base 12 of the toilet 10, much like the primary drain 14. In some embodiments, each side of the basin 18 has an overflow reservoir 22 and an overflow tube 24. In some embodiments, each side of basin 18 has an overflow reservoir 22, and a single overflow tube 24 connects both overflow reservoirs 22 to the drain. In some embodiments, the overflow tube 24 is a flexible hose and connects to a 1¼ inch drain system. The drain system may include a P-trap and maintain a proper 2 inch seal. The overflow water can be sent to a trap on either side of the toilet 10 capable of maintaining a 2 inch seal and to a down leg that can develop a siphon to pull water from the basin 18. The down legs can be connected back into the out leg of the toilet or directed to a special floor drain fitting, such as that show in FIGS. 3A-4B.

Figure 3A:
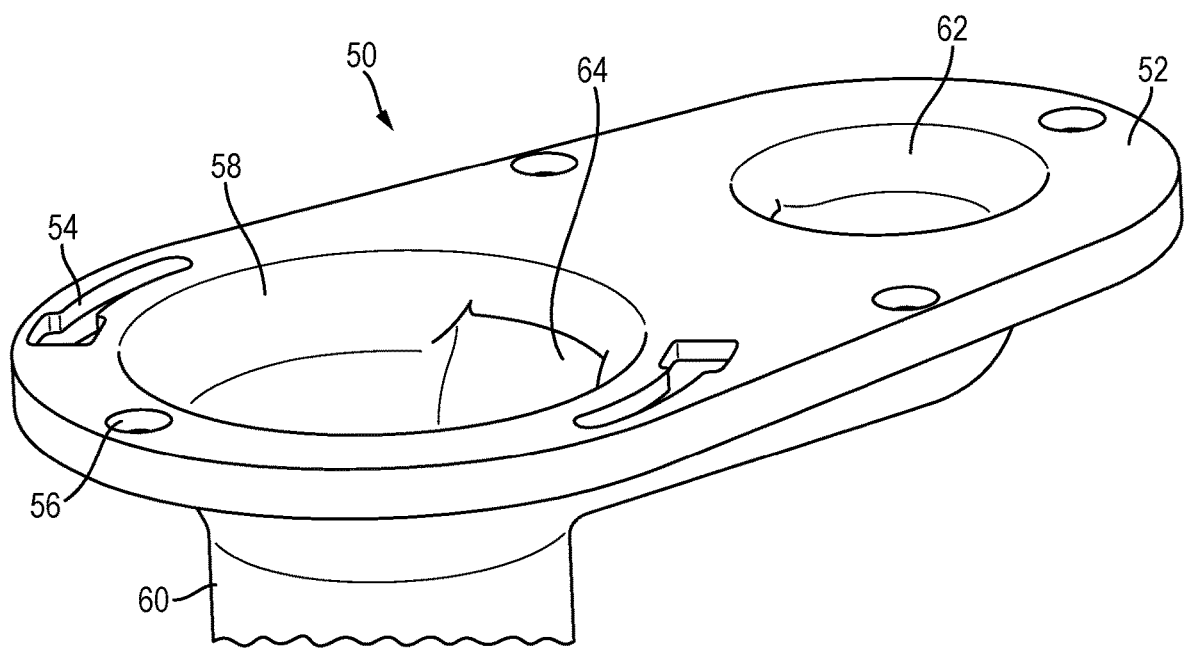
FIG. 3A is a perspective view of a floor drain to be used with an overflow toilet, according to an exemplary embodiment.
Figure 3B:
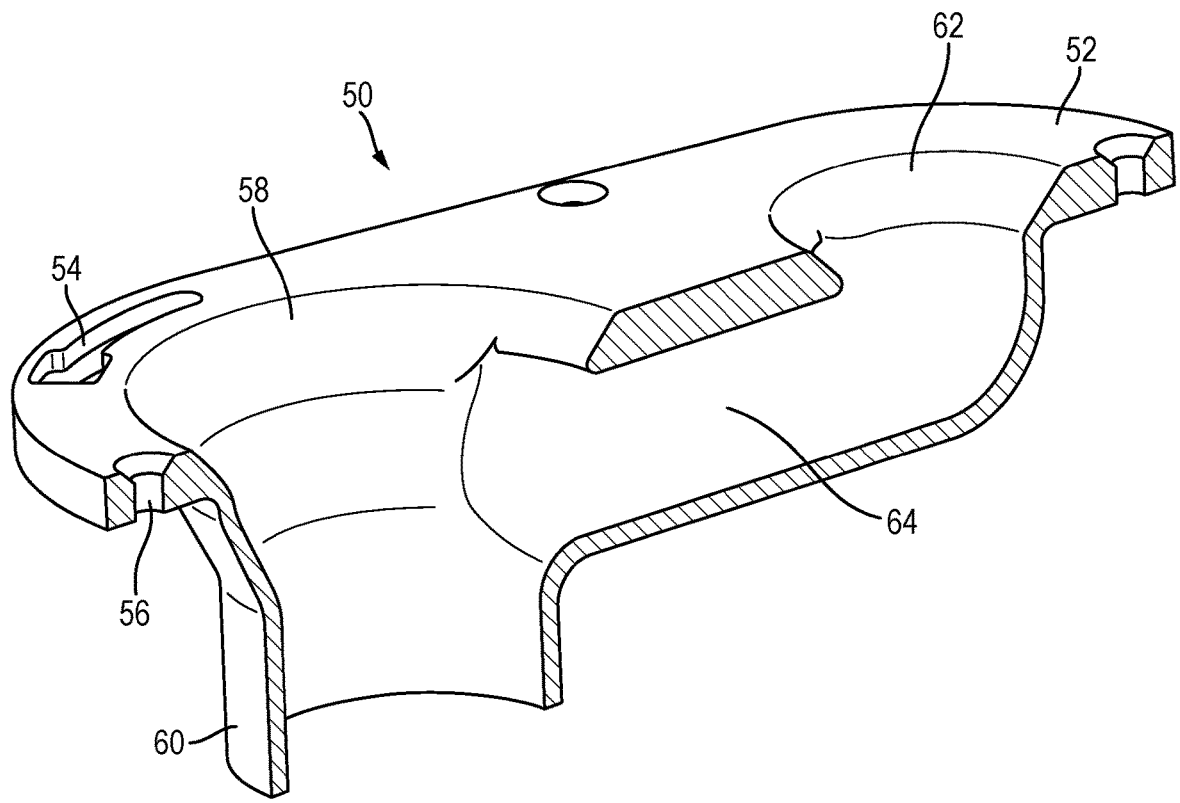
FIG. 3B is a cross sectional view of a floor drain to be used with an overflow toilet, according to an exemplary embodiment.

Referring to FIGS. 3A and 3B, a perspective view and a cross sectional view of a floor drain 50 to be used with the toilet 10 are shown, according to an exemplary embodiment. The floor drain 50 includes a top 52 that is flush with the floor. The toilet 10 sits above the floor drain 50 and couples to the floor drain 50. The floor drain 50 also includes t-bolt holes 54 and holes 56 for securing the floor drain 50 to the floor and to the toilet 10.

The floor drain also includes a primary inlet 58. The primary inlet 58 couples to the primary drain 14 to remove water and waste that occurs during normal use of toilet 10. The primary inlet 58 aligns with a drain 60 (e.g., a common outlet, etc.), which mates with a drain pipe in the floor. An overflow inlet 62 couples with the overflow tubing 24. The overflow inlet 62 provides a second outlet that will only receive water during an overflow situation. Water entering the overflow inlet 62 will pass through an overflow channel 64. The overflow channel 64 provides connection between the overflow inlet 62 and the drain 60. Accordingly, water received by the overflow inlet 62 also uses the drain 60 to reach the drain pipe in the floor. By providing the overflow inlet 62 and overflow channel 64, water captured in the overflow system from the overflow holes 20 can escape down the drain 60 when a clog is located upstream of the primary inlet 58.

Figure 4A:
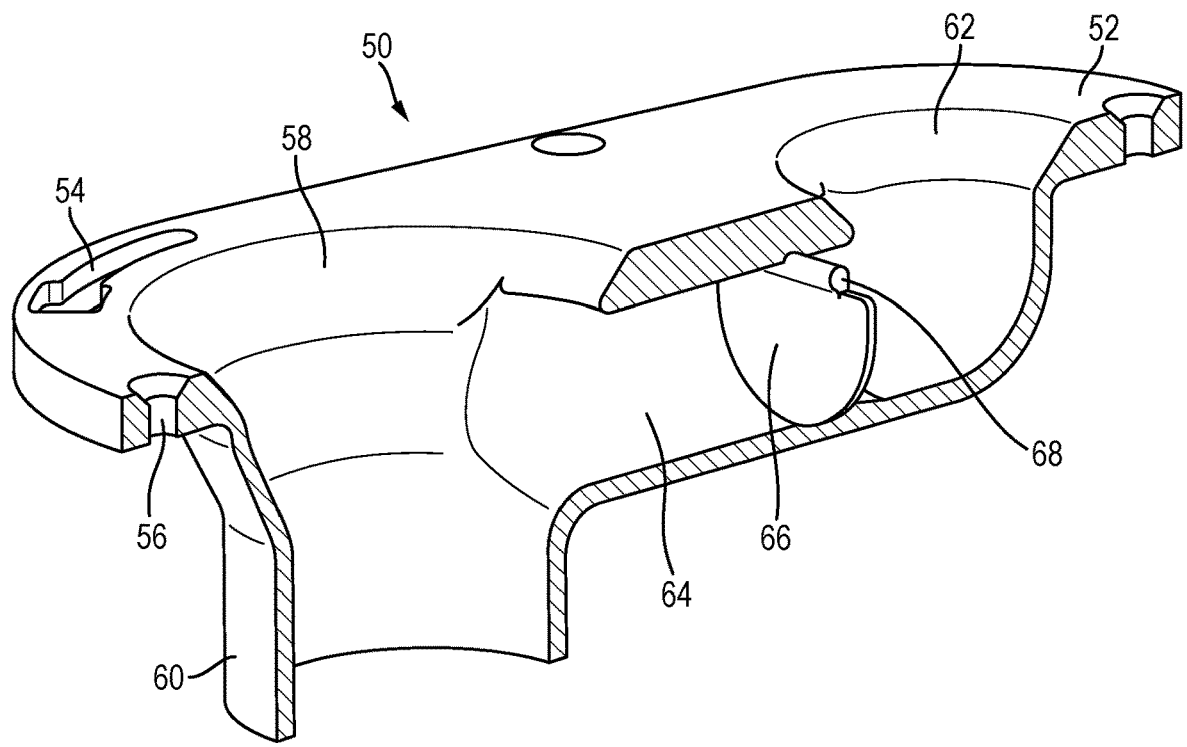
FIG. 4A is a cross sectional view of a second embodiment of a floor drain with a trap door in the closed position to be used with an overflow toilet, according to an exemplary embodiment.
Figure 4B:
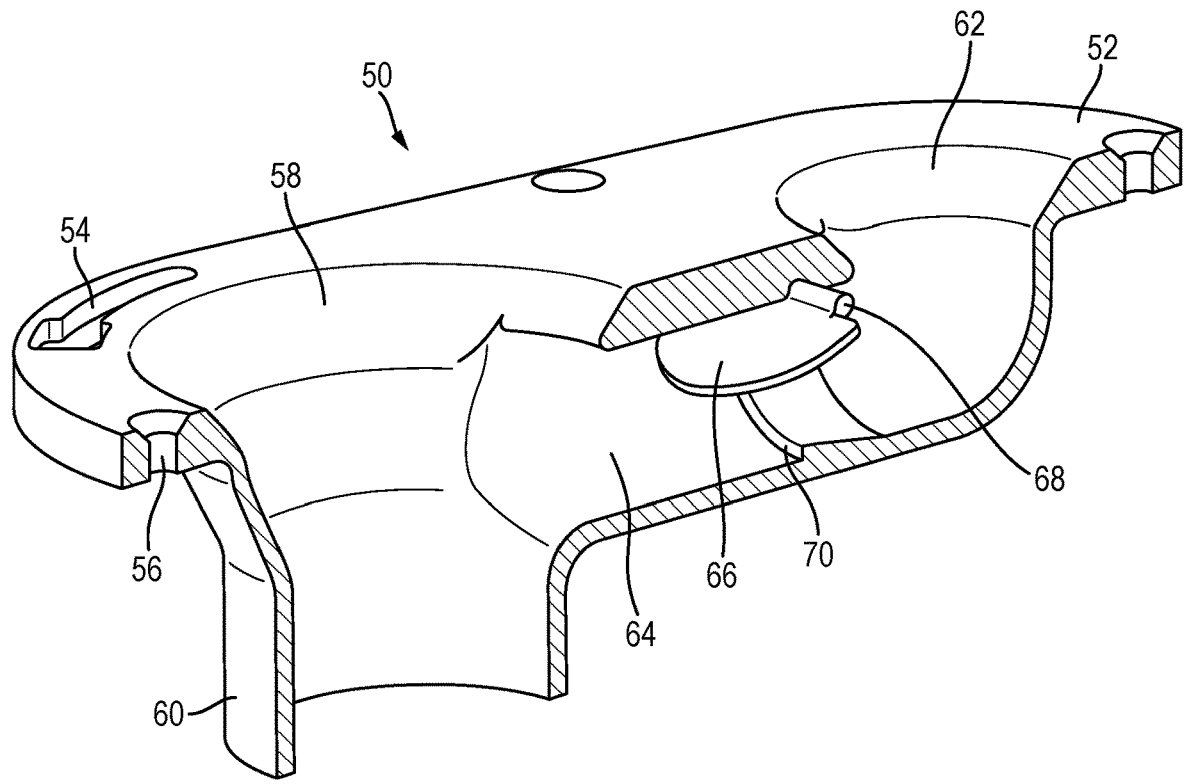
FIG. 4B is a cross sectional view of a second embodiment of a floor drain with a trap door in the open position to be used with an overflow toilet, according to an exemplary embodiment.

Referring to FIGS. 4A and 4B, a cross sectional view of a second embodiment of the floor drain 50 with a trap door 66 (e.g., a one-way valve) in the closed position and an open position to be used with toilet 10 are shown, according to an exemplary embodiment. The trap door 66 may be located in the overflow channel 64. While the trap door 66 is shown to be located near the inlet of overflow channel 64, the trap door 66 may be located at any location along the overflow inlet 62 or overflow channel 64. The trap door 66 includes a hinge 68 such that the trap door can move between a closed position (FIG. 4A) and an open position (FIG. 4B). When in the closed position, the trap door 66 abuts a ridge 70. The ridge 70 is formed in a lower portion of the overflow channel 64. In some embodiments, the ridge 70 may extend around a circumference of the overflow channel 64. The ridge 70 prevents the trap door 66 from being movable in two directions. By limiting the movement of the trap door 66 to one direction, water can come from the overflow inlet 62 and enter the drain 60, but the trap door 66 prevents water from the primary inlet 58 or the drain 60 from entering the overflow inlet 62. In some embodiments, the ridge 70 prevents overflow water from escaping out of the overflow holes 20 from pressure created when using a plunger to unclog the toilet 10. The overflow channel 64 and trap door 66 allow overflow water to escape down the drain 60 when the clog is above the primary inlet 58.

Figure 5:
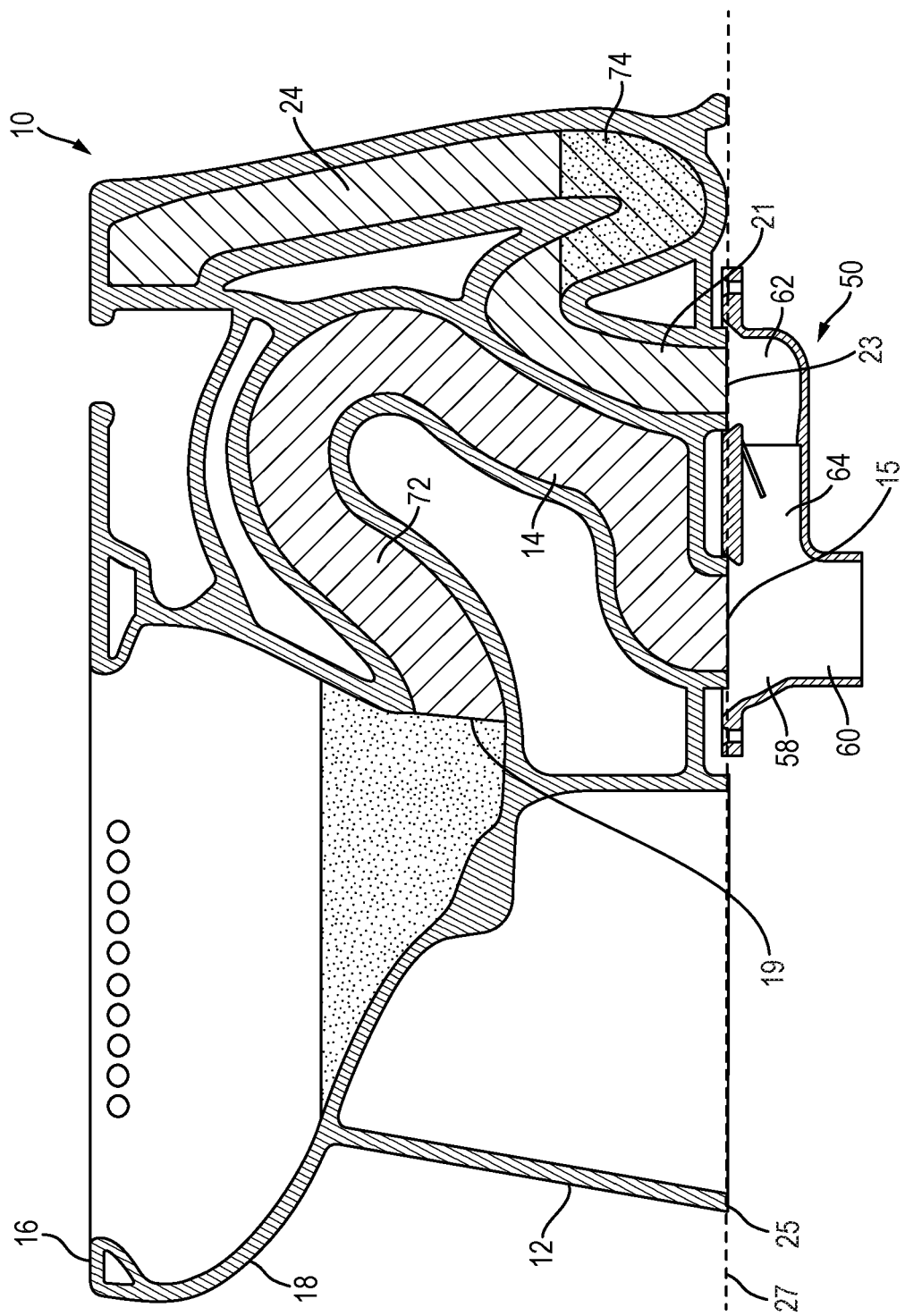
FIG. 5 is a cross section view of a toilet and floor drain, according to an exemplary embodiment.

Referring to FIG. 5, a cross section view of the toilet 10 and the floor drain 50 coupled together is shown, according to an exemplary embodiment. The toilet 10 includes the base 12, which supports the basin 18 and houses the primary drain 14. The basin 18 collects water and captures waste for removal. The basin 18 has an outlet coupled to the primary drain 14. The primary drain 14 eliminates the waste and water collected by the basin 18. The primary drain 14 couples to the floor drain 50 at the primary inlet 58 for removal of the waste and water down the drain 60. The primary drain 14 is structured to provide a main trapway 72 that allows the toilet 10 to maintain a specified amount of water in the basin 18 and the primary drain 14. Near the rear of the toilet 10 is the overflow tube 24. The overflow reservoir 22 is located around the rim 16 and directs water collected from the overflow holes 20 to the overflow tube 24. The overflow tube 24 couples to the floor drain 50 at the overflow inlet 62 for removal of the waste and water through the overflow channel 64 and the down drain 60. The overflow tube 24 may also define an overflow trapway 74 to maintain a specified amount of water in the overflow tube 24.

According to any embodiment, an overflow protection system is shown that can handle a clogged toilet when a flushometer or other commercial valve is stuck in an open position, redirect the extra water to the overflow protection system, and send the water to a drain past the obstruction. The overflow protection system for the toilet is shown to include a plurality of overflow holes, an overflow reservoir, an overflow tube and an overflow outlet. The overflow holes are located on a basin of the toilet. The overflow reservoir captures the water and directs the water to the overflow tube. The overflow tube directs the water from the overflow reservoir to the overflow outlet. The overflow outlet may bypass the clog in a primary drain to allow the overflow water to escape down through the drain. The overflow protection system may include an overflow drain fitting. However, other embodiments may include or omit certain components to suit particular applications.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments and that such variations are intended to be encompassed by the present disclosure.

The construction and arrangement of the elements of the overflow protection commercial toilets as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the disclosure.

Other substitutions, modifications, changes, and omissions may also be made in the design, operating conditions, and arrangement of the various exemplary embodiments without departing from the scope of the present disclosure. For example, any element (e.g., overflow holes, overflow reservoir, overflow tube, drain fitting, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the disclosure.

What is claimed is:

1. A drain assembly for being coupled directly to a toilet having a main trapway, primary toilet outlet downstream of the main trapway, an overflow trapway, and a secondary toilet outlet downstream of the overflow trapway, the drain assembly comprising:
   a top configured to be directly coupled to the toilet;
   a primary inlet configured to be in fluid communication with the primary toilet outlet when the top is mounted to the toilet;
   a secondary inlet configured to be in fluid communication with the secondary toilet outlet when the top is mounted to the toilet, wherein the secondary inlet is separate from the primary inlet;
   a channel fluidly coupling the primary inlet and the secondary inlet in a horizontal direction; and
   a common outlet coupled to a drain pipe that is vertically arranged with the common outlet and the primary inlet, the common outlet in fluid communication with the primary inlet and the secondary inlet.

2. The drain assembly of claim 1, wherein the primary inlet is aligned with the common outlet.

3. The drain assembly of claim 1, wherein the top is substantially flat.

4. The drain assembly of claim 3, wherein the channel extends in a direction that is substantially parallel to the top.

5. The drain assembly of claim 1, further comprising a bottom portion opposite the top, wherein the common outlet is disposed along the bottom portion.

6. The drain assembly of claim 1, wherein the common outlet is integrally formed with the primary inlet and the secondary inlet.

7. A toilet comprising:
   a base defining a primary toilet outlet and a secondary toilet outlet; and
   a basin supported by the base, the basin defining:
      a primary basin outlet in fluid communication with the primary toilet outlet by way of a primary drain path, the primary drain path comprising a main trapway; and
      a secondary basin outlet in fluid communication with the secondary toilet outlet by way of a secondary drain path, the secondary drain path comprising an overflow trapway; and a drain assembly comprising:
      a top configured to be mounted to the basin;
      a primary inlet in fluid communication with the primary toilet outlet when the top is mounted to the toilet;
      a secondary inlet in fluid communication with the secondary toilet outlet when the top is mounted to the toilet, wherein the secondary inlet is separate from the primary inlet;
      a channel fluidly coupling the primary inlet and the secondary inlet in a horizontal direction; and
      a common outlet coupled to a drain pipe that is in fluid communication with the primary inlet and the secondary inlet and arranged in a vertical direction with the primary inlet.

8. The toilet of claim 7, wherein the toilet is configured such that fluid is only provided from the secondary basin outlet to the secondary toilet outlet when fluid has collected within the basin above a threshold volume.

9. The toilet of claim 7, wherein the base defines a bottom surface disposed along a plane, and the primary toilet outlet and the secondary toilet outlet are disposed along the plane.

10. The toilet of claim 9, further comprising a rim supported by the basin, the rim configured to selectively support a toilet seat;
    wherein the secondary basin outlet is proximate the rim and the primary basin outlet is proximate the plane.

11. The toilet of claim 7, further comprising a reservoir coupled to the basin such that fluid from the secondary basin outlet is provided into the reservoir.

12. The toilet of claim 11, wherein the reservoir is in fluid communication with the secondary drain path such that fluid from the reservoir is provided through the secondary drain path to the secondary toilet outlet.

13. The toilet of claim 7, wherein the secondary basin outlet comprises at least one of a plurality of holes or a slot.

14. The toilet of claim 7, wherein the main trapway is configured to store water to form a first water seal, and the overflow trapway is configured to store water to form a second water seal.

15. The toilet of claim 7, wherein the top is in contact with the basin when the top is mounted to the basin.

16. A toilet comprising:
    a base supporting the toilet on a surface, the base defining a primary toilet outlet and a secondary toilet outlet spaced apart and independent from the primary toilet outlet;
    a basin supported by the base, the basin configured to selectively receive and collect water, the basin defining:
       a primary basin outlet in fluid communication with the primary toilet outlet by way of a primary drain path;
       a secondary basin outlet in fluid communication with the secondary toilet outlet by way of a secondary drain path; and
       an overflow trapway positioned along the secondary drain path and configured to maintain an amount of water therein;
    a reservoir coupled to the basin, the reservoir configured to selectively receive water from the secondary basin outlet and to collect water; and
    a drain configured to be coupled to the base, the drain comprising:
       a first inlet configured to receive water from the primary toilet outlet;
       a second inlet configured to receive water from the secondary toilet outlet in a horizontal direction, wherein the second inlet is separated from the first inlet; and a common outlet coupled to a drain pipe that is in fluid communication with the first inlet and the second inlet and arranged in a vertical direction with the primary inlet;

wherein the secondary drain path is in fluid communication with the reservoir such that water provided from the reservoir is provided to the secondary toilet outlet; and wherein water is provided to the secondary basin outlet from the reservoir once a target volume of water has collected within the basin.

17. The toilet of claim 16, wherein the basin is configured to selectively receive an amount of water, and at least one of a shape or a size of the secondary basin outlet is determined based on an amount of water selectively received by the basin.

18. The toilet of claim 16, wherein the reservoir is positioned within walls of the basin such that the reservoir is concealed within the basin.

19. The toilet of claim 16, wherein the basin further defines a main trapway positioned along the primary drain path and configured to maintain an amount of water therein.

20. The toilet of claim 16, wherein the first inlet is aligned with the common outlet.

* * * * *